US006051106A

United States Patent [19]
Omura et al.

[11] Patent Number: 6,051,106

[45] **Date of Patent: *Apr. 18, 2000**

[54] CAST-COATED PAPER AND PRODUCTION METHOD THEREOF

[75] Inventors: Tomonobu Omura; Takashi Ueno; Toshikazu Teramasa; Yoshihiro Kuroyama, all of Tokyo, Japan

[73] Assignee: Nippon Paper Industries Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/821,789

[22] Filed: Mar. 21, 1997

[30] Foreign Application Priority Data

Mar. 22, 1996 [JP] Japan .................................... 8-091818

[51] Int. Cl.$^{7}$ .............................. D21F 11/00; B32B 3/10; B32B 3/00; B32B 5/16

[52] U.S. Cl. .......................... 162/135; 162/137; 162/158; 162/181.1; 162/181.6; 162/184; 428/141; 428/195; 428/211; 428/331; 428/341; 427/362; 427/397.7

[58] Field of Search .................................... 162/135, 137, 162/158, 181.1, 181.6, 184; 428/141, 195, 211, 331, 341; 427/362, 397.7

[56] References Cited

U.S. PATENT DOCUMENTS

| | | | |
|---|---|---|---|
| 4,495,029 | 1/1985 | Bergmann et al. | 162/135 |
| 5,275,846 | 1/1994 | Imai et al. | 427/362 |
| 5,281,467 | 1/1994 | Shimada et al. | 428/195 |
| 5,397,619 | 3/1995 | Kuroyama et al. | 428/141 |

OTHER PUBLICATIONS

Derwent Abstract No. 97–209872.
Derwent Abstract No. 97–095013.
Derwent Abstract No. 96–135081.
Derwent Abstract No. 87–160425.
Derwent Abstract No. 96–482803.
Derwent Abstract No. 90–379954.
Derwent Abstract No. 91–291899.

*Primary Examiner*—Peter Chin
*Assistant Examiner*—Rob McBride
*Attorney, Agent, or Firm*—Millen, White, Zelano & Branigan, P.C.

[57] ABSTRACT

Provided is a cast-coated paper which comprises a raw paper having on at least one side thereof a layer of a coating composition comprising a pigment and a water based binder, with the layer having a surface treated with a coagulating solution containing one or more of an ammonium salt as a coagulant and smoothened by pressing the treated surface to a hot specular surface of metal while the layer is in a wet condition; and a method of producing the aforesaid cast-coated paper.

5 Claims, No Drawings

CAST-COATED PAPER AND PRODUCTION METHOD THEREOF

FIELD OF THE INVENTION

The present invention relates to a cast-coated paper of good quality and, more particularly, to a cast-coated paper which is suitable for ink jet recording with water based ink to ensure high quality in images printed thereon and enables a long-term continuous operation in the production thereof.

BACKGROUND OF THE INVENTION

A cast-coated paper is generally obtained by applying a coating solution containing a pigment and an aqueous binder to at least one side of a raw paper and pressing the resultant coating to a heated specular metal surface while it is in a wet state to copy the specular metal surface on the coating and at the same time to dry the coated paper. The cast-coated paper thus obtained has a feature of high gloss and high smoothness, compared with general coated papers which are finished with a super calender. Accordingly, it gives a very excellent printing effect when used in printing and a high-quality feeling when used for packaging material.

Further, in the field of full color image recording paper and the like whose markets are developing now, recording paper having high gloss has been produced by using a film as substrate or by adopting a wet-type lamination technique or a multilayer coating technique. In comparison with those production methods, a cast coating method is favorable in terms of cost and simplicity of processes. However, it has s drawback of being inferior in productivity to the method for producing a general coated paper.

More specifically, in the cast coating method, a coated paper must to be dried while the wet coating is pressed to the specular surface of metal. Consequently, the water contained in the coating should pass through a raw paper and evaporate on the back side of the paper. In cases where a general coated paper is produced, on the other hand, water is evaporated on the front side or both sides of the coating. Therefore, drying efficiency in the cast coating method is far lower than that in the preparation of a general coated paper; as a result, a cast-coated paper should be produced at a low speed, and thereby the productivity thereof becomes low.

For the purpose of improving drying efficiency in the cast coating method, it was proposed to increase the permeability of a raw paper in, e.g., Japanese Tokkai Sho 56-26094 and Japanese Tokkai Hei 3-193995 (The term "Tokkai" as used herein means an "unexamined published patent application"). However, the coatings of the cast-coated papers disclosed therein have a high coverage rate of from 10 to 30 g/m$^2$, so that a lot of water to be evaporated is present therein. On this account, the aforementioned means cannot sufficiently improve the productivity.

Further, the inferiority of the cast coating method in productivity is also due to low capability in continuous operations.

More specifically, in the production of a cast-coated paper, the releasability of paper web from a specular metal surface gradually deteriorates with the passage of time; as a result, the coating is partially picked off by the metal surface, namely the so-called "drum pick" occurs.

When the drum pick occurs, the paper web is broken in a short time and at the same time the specular metal surface becomes dirty in most cases. Consequently, the operation is interrupted for a long period of time for cleaning the specular metal surface.

In this connection, the specular surface of metal has so far been coated with a release agent, such as vegetable hardened oil, vegetable oxidized oil, tributyl phosphate, xylene, terpene, monochlorobenzene and their derivatives, to maintain good releasability of the specular metal surface from paper web.

Further, there has been added a release agent, such as stearic acid, polyethylene, polypropylene, paraffin, silicone oil and their derivatives, to a coating solution, a coagulating solution or a re-wetting solution to obtain good releasability of the paper web.

However, even when the above treatments for enhancing the releasability are carried out, the releasability of paper and that of specular metal surface are gradually deteriorated with a lapse of time.

Reasons therefor are considered as follows:

a) A release agent applied to the specular surface of metal gradually shifts into the coating to lose its effect, and b) A slight portion of the coating remains on a specular metal surface every time the paper web is released from the specular surface, and its accumulation on the specular surface makes it impossible to copy the specular surface and at the same time to lose the releasability from each other.

In an ink-jet recording system, on the other hand, images are formed on a recording paper by jetting droplets of ink in various ways, and such a recording system has features that it makes less noisy than dot impact recording systems and enables easy full color recording and high-speed recording.

Usually, an ink-jet recording system uses a water-base ink in most cases, and so it has a disadvantage of being inferior in drying properties of ink.

Therefore, it is required for the recording paper used for ink-jet recording system to have the following characteristics:

a) high drying speed of ink, b) neither feathering nor overflow of ink, c) high recording density, and d) no cockle generation due to absorption of ink.

It has already been proposed to produce ink-jet recording papers having all of those characteristics using a cast coating method (Japanese Tokkai Sho 62-95258, Japanese Tokkai Sho 62-264391, Japanese Tokkai Hei 2-274587 and Japanese Tokkai Hei 5-59684).

However, the cast-coated papers for ink-jet recording contain as the main pigment component a porous synthetic silica of large specific surface area, so that they absorb a great amount of release accelerating material to cause frequent paper break, thereby suffering a great drop in productivity, compared with cast-coated papers using other pigments as their main pigment component.

SUMMARY OF THE INVENTION

Therefore, a first object of the present invention is to provide a cast coated paper which not only has good quality but also ensures high productivity.

A second object of the present invention is to provide a method of producing a cast-coated paper which can realize a continuous operation of a long duration to ensure high productivity.

The above objects of the present invention are attained by a cast-coated paper which comprises a raw paper having on at least one side thereof a layer of a coating composition comprising a pigment and a water base binder, with the layer having a surface treated with a coagulating solution containing a coagulant and smoothened by pressing the treated surface to a hot specular surface of metal while the layer is in a wet condition, wherein the coagulant is an ammonium salt; and a method of producing the aforesaid cast-coated paper.

DETAILED DESCRIPTION OF THE INVENTION

The method of the present invention belongs to a coagulating process among cast coating processes. This coagulating process means a process comprising the steps of applying a coating composition to a raw paper, coagulating the resultant coating into a gel state having no fluidity, pressing the coagulated coating to a hot specular surface of metal to copy the specular metal surface on the surface of the coating. In this process, the coating coagulates through the salting-out of a water base binder contained therein, such as casein, by the use of a salt solution (coagulant).

Hitherto, in cases where cast-coated papers are produced adopting a coagulating process, metal salts of formic acid such as calcium formate and zinc formate have been prevailingly used as coagulant because they have high solubility in water and excellent salting-out effect; while ammonium salts have never been used because of their low coagulability.

However, the present inventors have carefully studied to find the following:

In case where a metal salt conventionally used as the coagulant is employed, the metal salt accumulates on the specular surface of metal to lose good releasability of the metal surface from the paper web; as a result, the breaking of paper web occurs in high frequency. In contrast to the above case, when an ammonium salt is used as coagulant, the ammonium salt decomposes on heating to discharge its base moiety in the form of ammonia into the atmosphere, so that it cannot be present in the form of the salt at the time of the release of paper web from the specular surface of metal.

Accordingly, when an ammonium salt is used a coagulant, the salt will never accumulate on the specular surface of metal maintaining good releasability of paper from the specular surface of metal, and thereby the breaking of paper occurs with reduced frequency.

Specific examples of an ammonium salt usable as a coagulant in the present invention includes the ammonium salts of formic acid, acetic acid, sulfuric acid, hydrochloric acid, nitric acid and phosphoric acid. In the present invention, at least one ammonium salt selected from the above-recited salts can be used.

Since an ammonium salt has less ability to coagulate a coating than conventionally used metal formates, the coagulation treatment performed with the ammonium salt cannot achieve the same gel state as usual so long as the ammonium salt is used in the same concentration as conventional metal formates, and so the product quality will be deteriorated. However, the gel state equivalent to the hitherto attained gel state can be accomplished by heightening the concentration of an ammonium salt as coagulant to ensure as good a surface gloss and high surface strength as with the conventional coagulants.

The concentration of an ammonium salt or ammonium salts used as the coagulant should be changed depending on the usage of a cast coated paper produced, and on the recipe for a coating composition used, the solids concentration therein, the coverage rate thereof and so on. In the present invention, the ammonium salt concentration in the coagulating solution is chosen so as not to adversely affect the product quality, the shelf stability and the capability in a continuous operation during the production. Specifically, the ammonium salt concentration is adjusted to the range of 2 to 40% by weight, preferably 5 to 30% by weight.

In other words, the use of an ammonium salt within the above concentration range can give the surface of a coating and the interior of a paper the same structures and properties as those obtained respectively in the case of using the conventional metal salts of formic acid and so on, thereby ensuring good properties with respect to surface gloss, surface strength and so on.

When the ammonium salt used is less than 2% by weight, the coating composition cannot coagulate sufficiently, so that part or all of the coating remaining uncoagulated will be squeezed out upon press of the resultant coating to the specular surface of metal. Accordingly, the layer having a high gloss surface, which is one of the great advantages of a cast-coated paper, cannot be obtained.

When the concentration of an ammonium salt as the coagulant exceeds 40% by weight, on the other hand, the pyrolysis of the ammonium salt cannot proceed sufficiently in the drying step to leave some portion of ammonium salt on the dried coating surface. Consequently, not only productivity will be lowered as described before but also ammonia will be discharged progressively from a product to considerably deteriorate the quality of the product. Further, the increase in an amount of the coagulant adhering to a paper lowers the pH of the paper to give rise to a fear of deteriorating the shelf stability of the product.

In addition, conventional coagulants can be used together with the ammonium salt of the present invention, if desired.

Specific examples of a coagulant usable together with the present ammonium salt includes acids, such as formic acid, acetic acid, citric acid, lactic acid, hydrochloric acid, sulfuric acid, carbonic acid and boric acid; the salts of those acids and metals such as calcium, zinc, barium, lead, potassium, sodium, cadmium and aluminum; and borax. When these coagulants are used together with an ammonium salt, however, the capability in continuous operation is somewhat shortened in some cases, compared with the independent use of the ammonium salt.

Specific examples of a water based binder used in the present invention include starch such as oxidized starch or esterified starch; cellulose derivatives such as carboxylmethyl cellulose and hydroxyethyl cellulose; polyvinyl alcohol resin; polyvinyl pyrrolidone; casein; gelatin; soybean protein; styrene-acrylic resin; styrene-butadiene latex; acrylic resin; vinyl acetate resin; vinyl chloride resin; urea resin; alkyd resin; urethane resin; polyethylene; and the derivatives of those resins. In the present invention, one or more of a water based binder selected properly from the above-recited ones can be used.

As for a pigment used in the coating of the present invention, kaolin, talc, calcium carbonate, calcium acetate, titanium dioxide, clay, zinc oxide, alumina, aluminum hydroxide and synthetic silica such as noncrystalline silica, amorphous silica or finely divided silica are examples thereof. In the present invention, at least one pigment selected properly from the above-recited ones can be employed.

When the present cast-coated paper is used for ink-jet recording in particular, it is desirable that from 40 to 100% by weight of the pigment used be the synthetic silica having a BET specific surface area in the range of 200 to 600 $m^2/g$, preferably 250 to 450 $m^2/g$.

The coating composition employed in the present invention, wherein at least the aforementioned pigment and water based binder are contained, is generally prepared in the form of an aqueous coating composition. An appropriate ratio between those ingredients is different depending on the binder composition, the pigment composition, the coating condition and so on, but it has no particular limitation as far as the cast-coated paper produced can satisfy the quality required for the intended use thereof. Further, the coating composition according to the present invention can optionally contain additives, such as a dispersant, a water retaining agent, a thickening agent, an anti-foaming agent, a preservative, a colorant, a waterproofing agent, a wetting agent, a drying agent, an initiator, a plasticizer, a fluorescent dye, an ultraviolet absorbent, a release agent, a lubricant and a cationic polyelectrolyte.

The suitable coating system for the present invention can be selected from among conventional coating systems, such as those using a blade coater, an air-knife coater, a roll coater, a comma coater, a bar coater, a gravure coater and so on.

When the present coating has a low coverage rate, it may fail to provide a good cast-coated surface. Oppositely, the excessive coverage rate may cause defects on the cast-coated surface due to the poor coagulation of the wetted coating, or it may require a reduction of the coating speed because the amount of water to be evaporated is large. Accordingly, it is desirable for the coverage rate to be in the range of 10 to 30 g/m2, but the present cast-coated paper can also be produced choosing the coverage rate from a range beyond the foregoing limits under some particular conditions concerning the sizing degree, permeability, smoothness and basis weight of a raw paper used, and the composition, viscosity and solids concentration of a coating composition used.

In accordance with the present invention, a cast-coated paper can be produced by preparing a coating composition containing a pigment and a water based binder, applying the coating composition to at least one side of a raw paper, treating the resultant coating with a coagulating solution containing ammonium salt(s) as a coagulant, pressing the coating treated to the cylindrical specular metal surface of a drum heated to about 100° C. while the treated coating is in a wet condition.

Additionally, it will be understood without any further explanation that the aforementioned coating can be provided on both sides of a raw paper to prepare a double-sided recording paper.

The cast-coated paper of the present invention has good quality, and can be produced with excellent productivity because it has remarkably improved capability in the continuous operation during the production thereof. In particular, the present cast-coated paper wherein at least 40% by weight of the pigment used in the coating is a synthetic silica is appropriate for ink-jet recording paper.

The present invention will now be illustrated in more detail by reference to the following examples, but these examples don't limit the scope of the invention. It should be understood that all modifications falling the true spirit and scope of the present invention are intended to be covered by the appended claims. Unless otherwise indicated, all percentages and all parts are by weight.

Preparation of Coating Compositions:

Coating Composition A;

100 parts of kaolin as a pigment, 15 parts of styrene-butadiene latex (made by Japan Synthetic Rubber CO., Ltd., trade name: JSR-0617) and 10 parts of casein (a product of New Zealand) as a binder, 5 parts of calcium stearate (made by San Nopco Ltd., trade name: Nopcoat SYC) as a release agent and 0.5 part of anti-foaming agent were mixed to prepare an aqueous Coating Composition A having a solids concentration of 45%.

Coating Composition B;

100 parts of kaolin as a pigment, 30 parts of styrene-butadiene latex (made by Japan Synthetic Rubber CO., Ltd., trade name: JSR-0617) and 10 parts of casein (a product of New Zealand) as a binder, 5 parts of calcium stearate (made by San Nopco Ltd., trade name: Nopcoat SYC) as a release agent and 0.5 part of anti-foaming agent were mixed to prepare an aqueous Coating Composition B having a solids concentration of 45%.

Coating composition C;

A mixture of 80 parts of kaolin and 20 parts of calcium carbonate as a pigment, 15 parts of styrene-butadiene latex (made by Japan Synthetic Rubber CO., Ltd., trade name: JSR-0617) and 10 parts of casein (a product of New Zealand) as a binder, 5 parts of calcium stearate (made by San Nopco Ltd., trade name: Nopcoat SYC) as a release agent and 0.5 part of anti-foaming agent were mixed to prepare an aqueous Coating Composition C having a solids concentration of 45%.

Coating Composition D;

100 parts of synthetic silica having a BET specific surface area of 320 $m^2/g$ (made by Mizusawa Industrial Chemicals K.K., trade name: Mizukasil P-87) as a pigment, a mixture of 10 parts of styrene-butadiene latex (made by Japan Synthetic Rubber Co., Ltd., trade name: JSR-0617) and 30 parts by weight of casein (a product of New Zealand) as a binder and 5 parts of calcium stearate (made by San Nopco Ltd., trade name: Nopcoat SYC) as a release agent and 0.5 part of anti-foaming agent were mixed to prepare an aqueous Coating Composition D having a solids concentration of 30%.

Coating Composition E;

A mixture of 40 parts of synthetic silica having a BET specific surface area of 320 $m^2/g$ (made by Mizusawa Industrial Chemicals K.K., trade name: Mizukasil P-87) and 60 parts of columnar calcium carbonate (made by Okutama Kogyo Co., Ltd., trade mane: Tama Pearl #123) as a pigment, a mixture of 10 parts of styrene-butadiene latex (made by Japan Synthetic Rubber Co., Ltd., trade name: JSR-0617) and 30 parts by weight of casein (a product of New Zealand) as a binder and 5 parts of calcium stearate (made by San Nopco Ltd., trade name: Nopcoat SYC) as a release agent and 0.5 part of anti-foaming agent were mixed to prepare an aqueous Coating Composition E having a solids concentration of 30%.

Coating Composition F;

100 parts of synthetic silica having a BET specific surface area of 600 $m^2/g$ (made by Fuji Davison Chemical Ltd., trade name: Syloid 800) as a pigment, a mixture of 10 parts of styrene-butadiene latex (made by Japan Synthetic Rubber Co., Ltd., trade name: JSR-0617) and 30 parts by weight of casein (a product of New Zealand) as a binder and 5 parts of calcium stearate (made by San Nopco Ltd., trade name: Nopcoat SYC) as a release agent and 0.5 part of anti-foaming agent were mixed to prepare an aqueous Coating Composition F having a solids concentration of 30%.

Coating Composition G;

100 parts of synthetic silica having a BET specific surface area of 180 $m^2/g$ (made by Mizusawa Industrial Chemicals K.K., trade name: Mizukasil P-802) as a pigment, a mixture of 10 parts of styrene-butadiene latex (made by Japan Synthetic Rubber Co., Ltd., trade name: JSR-0617) and 30 parts by weight of casein (a product of New Zealand) as a binder and 5 parts of calcium stearate (made by San Nopco Ltd., trade name: Nopcoat SYC) as a release agent and 0.5 part of anti-foaming agent were mixed to prepare an aqueous Coating Composition G having a solids concentration of 30%.

Preparation of Coagulating Solution:

Coagulating Solution (1);

A coagulating solution containing 10% of ammonium sulfate as a coagulant and 0.5% of a release agent (Nopcoat SYC) was prepared.

Coagulating Solution (2);

A coagulating solution containing 10% of ammonium formate as a coagulant and 0.5% of a release agent (Nopcoat SYC) was prepared.

Coagulating Solution (3);

A coagulating solution containing 20% of ammonium sulfate as a coagulant and 0.5% of a release agent (Nopcoat SYC) was prepared.

Coagulating solution (4);

A coagulating solution containing 10% of calcium formate as a coagulant and 0.5% of a release agent (Nopcoat SYC) was prepared.

Coagulating Solution (5);

A coagulating solution containing 20% of zinc sulfate as a coagulant and 0.5% of a release agent (Nopcoat SYC) was prepared.

EXAMPLE 1

The Coating Composition A was coated on one side of a raw paper at a coverage rate of 18 g/m$^2$ by means of a comma coater, and then treated with Coagulating Solution (1). The thus treated coating was pressed to the specular metal surface heated to 100° C. while the coating was in a wet condition, and dried to produce a cast-coated paper.

EXAMPLE 2

The Coating Composition B was coated on one side of a raw paper at a coverage rate of 18 g/m$^2$ by means of a comma coater, and then treated with Coagulating Solution (1). The thus treated coating was pressed to the specular metal surface heated to 100° C. while the coating was in a wet condition, and dried to produce a cast-coated paper.

EXAMPLE 3

The Coating Composition C was coated on one side of a raw paper at a coverage rate of 18 g/m$^2$ by means of a comma coater, and then treated with Coagulating Solution (1). The thus treated coating was pressed to the specular metal surface heated to 100° C. while the coating was in a wet condition, and dried to produce a cast-coated paper.

EXAMPLE 4

The Coating Composition A was coated on one side of a raw paper at a coverage rate of 18 g/m$^2$ by means of a comma coater, and then treated with Coagulating Solution (2). The thus treated coating was pressed to the specular metal surface heated to 100° C. while the coating was in a wet condition, and dried to produce a cast-coated paper.

EXAMPLE 5

The Coating Composition A was coated on one side of a raw paper at a coverage rate of 18 g/m$^2$ by means of a comma coater, and then treated with Coagulating Solution (3). The thus treated coating was pressed to the specular metal surface heated to 100° C. while the coating was in a wet condition, and dried to produce a cast-coated paper.

COMPARATIVE EXAMPLE 1

The Coating Composition A was coated on one side of a raw paper at a coverage rate of 18 g/m$^2$ by means of a comma coater, and then treated with Coagulating Solution (4). The thus treated coating was pressed to the specular metal surface heated to 100° C. while the coating was in a wet condition, and dried to produce a cast-coated paper.

COMPARATIVE EXAMPLE 2

The Coating Composition C was coated on one side of a raw paper at a coverage rate of 18 g/m$^2$ by means of a comma coater, and then treated with Coagulating Solution (4). The thus treated coating was pressed to the specular metal surface heated to 100° C. while the coating was in a wet condition, and dried to produce a cast-coated paper.

COMPARATIVE EXAMPLE 3

The Coating Composition A was coated on one side of a raw paper at a coverage rate of 18 g/m$^2$ by means of a comma coater, and then treated with Coagulating Solution (5). The thus treated coating was pressed to the specular metal surface heated to 100° C. while the coating was in a wet condition, and dried to produce a cast-coated paper.

COMPARATIVE EXAMPLE 4

The Coating Composition C was coated on one side of a raw paper at a coverage rate of 18 g/m$^2$ by means of a comma coater, and then treated with Coagulating Solution (5). The thus treated coating was pressed to the specular metal surface heated to 100° C. while the coating was in a wet condition, and dried to produce a cast-coated paper.

Each of Examples 1 to 5 and Comparative Examples 1 to 4 were examined for the capability in a continuous operation, the surface gloss of the coating formed and the pH on the surface of the coating. The criteria employed for evaluation of those properties are as follows:

i) Capability in Continuous Operation:

A comparison of the capability of cast-coated paper samples in continuous operation is made by examining a duration of the coating operation (or the length of paper web coated without any break). The data set forth in Table 1 are relative values, taking the cast-coated paper produced in Comparative Example 1 as the standard. The larger the value, the higher the capability in continuous operation. The value of no smaller than 1.4 indicates a remarkable improvement in the capability of a cast-coated paper in continuous operation.

ii) Surface Gloss of Coating:

The surface gloss, which is one of the most prominent features of a cast-coated paper, is evaluated by the 75° gloss on the coating surface determined in accordance with JIS P-8142.

iii) pH on Surface of Coating:

A coagulant applied in excess may leave an acid on or inside the coating after the production of a cast-coated paper. The acid, as mentioned hereinbefore, adversely affects on shelf stability of the cast coated paper produced. Therefore, pH on the surface of the coating is examined, and evaluated in accordance with TAPPI UM-471. If the pH on the surface of a coating is from 6 to 8, the resultant cast-coated paper causes no trouble in self stability.

The results obtained are shown in Table 1.

TABLE 1

| | Coating | | Capability | Surface of Coating | |
|---|---|---|---|---|---|
| | Composition | Coagulating Solution | in Continuous Operation | Surface Gloss (%) | pH |
| Example 1 | A | (1) | 3.0 | 89.1 | 6.5 |
| Example 2 | B | (1) | 3.2 | 93.0 | 6.5 |
| Example 3 | C | (1) | 3.0 | 88.5 | 6.5 |
| Example 4 | A | (2) | 3.1 | 87.7 | 6.7 |
| Example 5 | A | (3) | 2.9 | 90.3 | 6.3 |
| Compar. Ex. 1 | A | (4) | 1.0 | 90.1 | 6.9 |
| Compar. Ex. 2 | C | (4) | 1.1 | 89.3 | 6.9 |
| Compar. Ex. 3 | A | (5) | 1.0 | 89.0 | 6.9 |
| Compar. Ex. 4 | C | (5) | 1.0 | 88.4 | 6.9 |

The data shown in Table 1 demonstrate the effectiveness of the present invention.

EXAMPLE 6

Coating Composition D was coated on one side of a raw paper with a comma coater so as to have the intended coverage rate of 18 $g/m^2$, and then treated with a coagulating solution containing 10 weight % of ammonium sulfate as a coagulant and 1 weight % of a cationic polyelectrolyte (made by Daiwa Chemical Industries, Ltd., trade name: Dyefix YK-50) as a water proofing agent. The thus treated coating was pressed to the specular surface of metal heated to 100° C. while the coating was in a wet condition, and dried. Thus, a cast-coated paper for ink-jet recording was produced.

EXAMPLE 7

A cast coated paper for ink-jet recording was produced in the same manner as in Example 6, except that the amount of ammonium sulfate used as coagulant was changed to 20 weight %.

EXAMPLE 8

A cast coated paper for ink-jet recording was produced in the same manner as in Example 6, except that the amount of ammonium sulfate used as coagulant was changed to 30 weight %.

EXAMPLE 9

A cast coated paper for ink-jet recording was produced in the same manner as in Example 6, except that the amount of ammonium sulfate used as coagulant was changed to 40 weight %.

EXAMPLE 10

A cast coated paper for ink-jet recording was produced in the same manner as in Example 6, except that the amount of ammonium sulfate used as coagulant was changed to 5 weight %.

EXAMPLE 11

A cast coated paper for ink-jet recording was produced in the same manner as in Example 6, except that the ammonium sulfate used as coagulant was replaced by ammonium formate.

EXAMPLE 12

A cast coated paper for ink-jet recording was produced in the same manner as in Example 6, except that Coating Composition E was used in place of Coating Composition D.

EXAMPLE 13

A cast coated paper for ink-jet recording was produced in the same manner as in Example 6, except that Coating Composition F was used in place of Coating Composition D.

COMPARATIVE EXAMPLE 5

A cast coated paper for ink-jet recording was produced in the same manner as in Example 6, except that the calcium formate was used in place of ammonium sulfate.

COMPARATIVE EXAMPLE 6

A cast coated paper for ink-jet recording was produced in the same manner as in Example 6, except that the zinc formate was used in place of ammonium sulfate.

COMPARATIVE EXAMPLE 7

A cast coated paper for ink-jet recording was produced in the same manner as in Example 6, except that the amount of ammonium sulfate used as coagulant was changed to 1 weight %.

COMPARATIVE EXAMPLE 8

A cast coated paper for ink-jet recording was produced in the same manner as in Example 6, except that the amount of ammonium sulfate used as coagulant was changed to 50 weight %.

COMPARATIVE EXAMPLE 9

A cast coated paper for ink-jet recording was produced in the same manner as in Example 6 except that Coating Composition G was used in place of Coating Composition D.

The cast-coated papers produced in Examples 6 to 13 and Comparative Example 5 to 9 were each examined for the capability in continuous operation (taken the value obtained in Comparative Example 5 as the standard), the surface gloss of the coating and the pH on the surface of the coating in accordance with the same criteria as mentioned above. The suitability of these cast-coated papers for ink-jet recording and a bad smell from the products were evaluated as follows:

1) Recording Suitability:

In order to examine recording suitability for ink-jet recording system, attention was paid to ink absorbency of a cast-coated paper produced for ink-jet recording. Specifically, a black solid pattern was recorded on a cast-coated paper sample by means of a full color ink jet printer, and thereby the ink absorbency was evaluated by visual observation according to the following criteria;

| | |
|---|---|
| No defect was observed in the recorded pattern | ○ |
| Although some defects were observed in the recorded pattern, the recording quality was above the lowest acceptable level | Δ |
| Defects were clearly observed in the recorded pattern | X |

2) Bad Smell from Products:

A bad smell from a cast-coated paper sample was organoleptically evaluated by the following criteria.

| | |
|---|---|
| No bad smell was perceived | ○ |
| A faint bad smell was perceived, but it was possible to maintain the quality as a product | Δ |
| A bad smell was emitted, so it was impossible to maintain the quality as a product | X |

The evaluation results are shown in Table 2, which demonstrate the effectiveness of the present invention.

TABLE 2

| | Coagulant | Coagulant Concentration (weight %) | Pigment: Slica Content (weight %) | Pigment: Specific surface area of Silica ($m^2/g$) | Recoading Suitability | Capability in Continuous Operation | Surface Gloss (%) | Bad Smell |
|---|---|---|---|---|---|---|---|---|
| Example 6 | ammonium sulfate | 10 | 100 | 320 | ○ | 3.2 | 86.0 | ○ |
| Example 7 | ammonium sulfate | 20 | 100 | 320 | ○ | 3.0 | 86.7 | ○ |
| Example 8 | ammonium sulfate | 30 | 100 | 320 | ○ | 2.8 | 87.5 | Δ |
| Example 9 | ammonium sulfate | 40 | 100 | 320 | ○ | 2.3 | 87.9 | Δ |
| Example 10 | ammonium sulfate | 5 | 100 | 320 | ○ | 3.4 | 84.1 | ○ |
| Example 11 | ammonium formate | 10 | 100 | 320 | ○ | 3.3 | 86.1 | ○ |
| Example 12 | ammonium sulfate | 10 | 40 | 320 | Δ | 3.5 | 88.1 | ○ |
| Example 13 | ammonium sulfate | 10 | 100 | 600 | ○ | 1.5 | 86.1 | ○ |
| Compar. Ex. 5 | calcium sulfate | 10 | 100 | 320 | ○ | 1.0 | 86.3 | ○ |
| Compar. Ex. 6 | zinc formate | 10 | 100 | 320 | ○ | 1.1 | 85.8 | ○ |
| Compar. Ex. 7 | ammonium sulfate | 1 | 100 | 320 | ○ | 2.6 | 47.1 | ○ |
| Compar. Ex. 8 | ammonium sulfate | 50 | 100 | 320 | ○ | 2.2 | 85.7 | X |
| Compar. Ex. 9 | ammonium sulfate | 10 | 100 | 180 | X | 2.6 | 86.1 | ○ |

What is claimed is:

1. A method of producing a cast-coated paper comprising the steps of:

applying a coating composition comprising a pigment and a water based binder to at least one side of a raw paper to form a layer, treating the layer with a coagulating solution which is free of binder comprising one or more ammonium salts in a proportion of from 2 to 40% by weight, based on the weight of the coagulating solution, without undergoing drying and smoothing treatments and pressing the treated layer surface to a hot specular surface of metal while the layer is in a wet condition.

2. A method according to claim 1, wherein 40 to 100% by weight of said pigment contained in the coating composition is a synthetic silica having a BET specific surface area of from 200 to 600 $m^2/g$.

3. A method of producing a cast-coated paper comprising the steps of:

applying a coating composition comprising a pigment and a water based binder to at least one side of a raw paper to form a layer, treating the layer with a coagulating solution which is free of binder and pigment and consists essentially of one or more ammonium salts in a proportion of from 2 to 40% by weight, based on the weight of the coagulating solution, and optionally additives which improve releaseability and waterproofness, without undergoing drying and smoothing treatments and pressing the treated layer surface to a hot specular surface of metal while the layer is in a wet condition.

4. A method as in claim 1 wherein the coagulating solution additionally contains a release agent, a water proofing agent or both.

5. A method as in claim 3 wherein the coagulating solution additionally contains a release agent, a water proofing agent or both.

* * * * *